Sept. 10, 1957     A. J. TOTI     2,805,443
FOWL DEFEATHERING APPARATUS
Filed Sept. 7, 1951
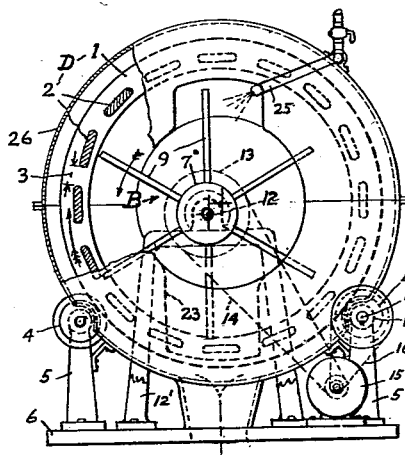
FIG. 1
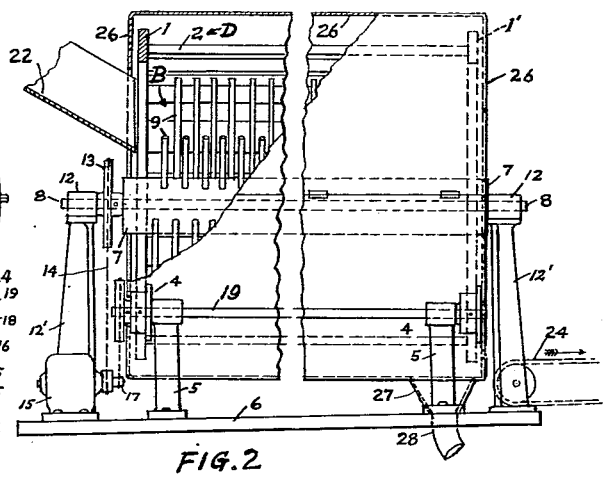
FIG. 2
FIG. 3
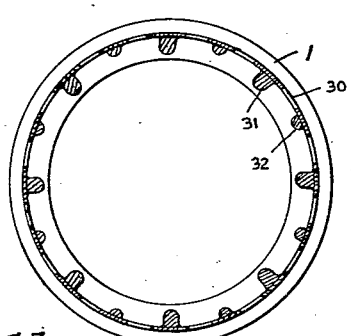
FIG. 6
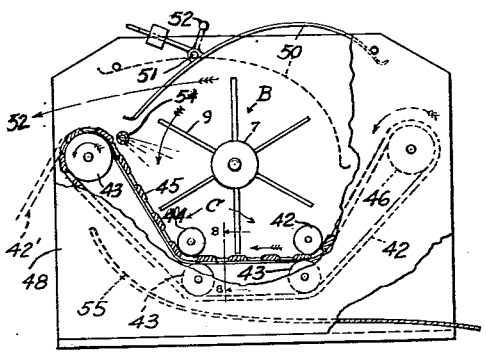
FIG. 5
FIG. 8
FIG. 9
FIG. 7
FIG. 4
INVENTOR.
Andrew J. Toti
BY
HIS ATTORNEY.

United States Patent Office 2,805,443
Patented Sept. 10, 1957

2,805,443

FOWL DEFEATHERING APPARATUS

Andrew J. Toti, Modesto, Calif., assignor to Honolulu Oil Corporation, a corporation of Delaware Application September 7, 1951, Serial No. 245,571

13 Claims. (Cl. 17—11.1)

This invention relates to a fowl defeathering apparatus and has for its object improvements over prior apparatus used for this purpose, and contributing to more efficient action and lower cost. Other advantages and features of the invention and construction will appear in the following description and accompanying drawings.

In the drawings:

Fig. 1 is a front end view of a horizontal drum type of a defeathering machine made in accordance with my invention and with part of the forward end wall of the casing and forward bearing broken away to reveal the beater and inner construction.

Fig. 2 is a side view of Fig. 1 with part of the side wall of the casing and drum broken away.

Fig. 3 is a sectional end view of a modified form of drum or cage.

Fig. 4 is a sectional side view of a vertical type of machine embodying the same invention.

Fig. 5 is a plan view of the open top drum and beater only of Fig. 4.

Fig. 6 is a side elevation of a conveyor type of machine with the forward side of the casing broken away embodying the same invention.

Fig. 7 is a detail of the beater core which may be used.

Fig. 8 is an enlarged cross sectional detail of Fig. 6 taken along the line 8—8 thereof.

Fig. 9 is an end view of a variation in form of the drum with beater in position.

Briefly described the invention includes tumbling the fowl about in every direction while whipping or striking its feathered surface at all points with flexible beaters with a more or less wiping or dragging frictional action or blows to remove the feathers. The beaters being preferably of soft flexible rubber, natural or synthetic, or other flexible friction material such as leather, ropes, etc. but preferably of a rubber compound. The fowl are supported during the operation preferably by a cradle or drum-like container, and preferably the fowl after first killing and draining of blood, are dipped in hot water, and water (preferably hot) is sprayed on the fowl and/or the beaters during the picking operation, though some fowl may be run through dry with good results.

In the "drum" type of machine shown in Figs. 1 and 2, the drum "D" is substantially horizontally disposed, being tilted slightly downward at the rear or discharge end to urge the fowl to the outlet end. The "drum" comprises two circular end rings 1 and 1' joined by longitudinally extending slats 2 spaced to leave substantial spaces 3 between them. These rings may be rotatably supported as by flanged rollers or wheels 4 at both ends carried by bearing stands 5 extending upward from a base frame 6. The structure described forms what may be more properly described as a cylindrical cage or cradle to receive the loose fowl, and while it is here shown with its "wall" made of spaced slats, it could be of round bars, or even heavy wire of elongated mesh with open spaces big enough to pass large fowl feathers, or the "wall" may be of sheet metal as indicated in Figs. 3 and 9, and may entirely surround the beaters 9 as shown in Figs. 1, 5 and 9, or may but partially embrace the beaters as shown in Fig. 6 wherein the upper run of the conveyor forms a "cradle wall means" presenting the fowls to the action of the beaters.

The cylindrical rotary beater assembly "B" extends longitudinally within the drum and may comprise (see Fig. 7) a core 7 with shaft 8 and several rows of soft flexible beater members 9 extending radially from bars 10 forming part of the core, the beater members being headed at their inner ends 11, and passed through holes in the bars or in a plain cylindrical core if the bars are not used. The beater members 9 are preferably roughened or transversely grooved or ribbed exteriorly as well known in the art, and are preferably soft enough to all hang down when the beater core is not rotating but are indicated in the figures as extending radially (as though the beater were rotating) for clarity of the showing.

The beater shaft 8 is rotatably supported at opposite ends by bearings 12 on pedestals 12' extending from the base 6 and carries a driving sprocket or pulley 13 at one end driven by a belt or chain 14 from an electric motor 15 secured to the base. This motor may also rotate the drum D as by a short belt or chain drive 16 extended from a suitable pulley or sprocket 17 on the motor to a sprocket or pulley 18 on the shaft 19 of one pair of the rollers 4 at one side of the drum which are secured to the shaft to drive the drum by friction, tho obviously a gear on the shaft may mesh with a rim gear secured to one end of the drum if desired, all so that while the beater assemblage or rotor B is turning in the direction shown by the arrow in the drawing Fig. 1 the drum will be going in the opposite direction, also shown by an arrow, to tend to carry any loose fowl from the right side or at the bottom of the drum back again toward the left into contact with the oppositely moving beaters, or retard any fowl descending on the incline at the left side of the drum between the beaters and the drum, tho the fowl will also tend to fall back by gravity at the right-hand side of the drum into the beaters.

The fowl may be introduced at the front end of the drum as from a conveyor or chute 22, and preferably the drum is tilted slightly to cause the fowl to move toward the opposite or discharge end, as the drum rotates, and out of an opening at 23 in the rear end of the casing to fall onto a belt conveyor 24 to be carried to further processing. Instead of the whole machine being tilted slightly the drum may be slightly larger at the discharge end to produce the same effect.

A water spray pipe perforated for a distance is provided as at 25, or other beater shaft 8 may be hollow and also used for the water spray. It is preferable that the water used be hot, tho not absolutely essential.

It is also desirable to surround the drum with a sheet metal casing 26 to intercept any water spray and also catch the feathers working and thrown through the wide slots between the slotted wall of the drum and guide them from the drum at the discharge end as at 27 and to a suction pipe as at 28. The angle of tilting of the drum and the length of the drum determines the time or duration of treatment of the fowl to secure the defeathering wanted.

Instead of the drum having a spaced slat wall as shown in Fig. 1, the wall may be round bars as shown in Fig. 5 and which may be of wood, metal, or either covered with rubber, as sections of a garden hose—or—the drum wall may be a solid or perforated sheet 30 as indicated in Fig. 3 and provided with ribs extending lengthwise or slightly at an angle within, either all one size or staggered large 31 and small 32, or a plain wall covered with rough sheet rubber or other friction material will function to a degree such wall variations broadly considered as "wall means."

The axis of the beater is preferably offset somewhat from the axis of the drum as shown in Fig. 1.

In the vertical "drum" machine shown in Figs. 4 and 5 as stated, the "slats" of Fig. 1 give way to spaced round bars 29 or grillage construction, and the flat bottom end 33 of the drum is preferably ribbed as at 34. In this type the beater rotor is made and numbered as given for Fig. 1 and rotated on a vertical shaft 8 as by an electric motor 35 belted to it as at 36 or otherwise arranged to drive it. The shaft 8 and beater are suspended from a bearing 56 carried on a spider frame 56'. The drum may be fixed, or it may be revolved in the opposite direction from the beater as explained for Fig. 1 as by a second motor 37 with worm drive 38 to a vertical hub 40 extending from the bottom of the drum, and which hub is rotatably supported on a fixed vertical shaft 39. It is obvious that the drum of Fig. 1 may be kept stationary, but at reduced efficiency of the machine.

This design may also be provided with water spray pipe 25' and spray protective casing 26'. This style is more for small machines where the machine is preferably stopped to remove the fowl.

In the design of Figs. 6 and 8 the support for the fowl is a perforated traveling belt or chains with cross slats generally of cradle form "C" and comprises a pair of endless chains 42 running over supporting and guiding sprockets or wheels 43, 44, the chains being fitted with the well known attachment links cross connected at spaced intervals with slats 45 corresponding to the slats 2 of Fig. 1. In Fig. 8 the arrangement of chains and slats is shown in cross section and it will be noted that sheet metal guard plates 49 cover the guide wheels 44 which are within the cradle. These plates are omitted from Fig. 6 for clarity.

The conveyor thus formed is driven from one pair of end sprockets 46 by any suitable drive not shown and the depressed central portion of the upper run of the conveyor forms a cradle in which the fowl are moved by the conveyor into contact with the beater arms 9 as explained for Fig. 1, tho the fowl will tend to fall by gravity into the beaters from either upwardly slanted end of the conveyor even if not running. The beater "B" is revolved by driving means not shown, at a speed to make the beater arms travel faster than the conveyor, and the fowl dropped freely onto the conveyor are carried into contact with the beaters, or, if the fowl are dropped above the downward moving side of the beaters the conveyor ridges or slats will retard the downward movement of the fowl while the beaters aided by the special conveyor construction will tumble and turn the fowl about.

In operation the loose fowl is rapidly turned about in all directions including end for end and spreading the wings and legs by centrifugal force, and occasionally passes clear over the beaters B, so a suitable casing 48 is provided to form side walls for the apparatus, and between them is a curved guide plate 50 pivoted to a cross shaft 51 provided with a counterbalanced handle 52 for swinging the plate 50 from solid line to dotted line position, against the stops indicated and when in the latter position will discharge the picked fowl over the top of the beater 13 and out of the space as indicated by the dotted arrow 53 to fall on any suitable conveyor (not shown) or into a second beating compartment like the one shown, and with the conveyor extended to serve it also if desired and as indicated by the dotted lines 42'.

It should be noted that the operation of the guide plate 50 may be timed from the conveyor drive or separate timing drive, to operate at intervals to discharge the picked fowls, and which any mechanic can arrange, tho, a drawing will be furnished if required.

A water spray pipe may also be used with the form of machine shown in Fig. 6 and such a pipe is indicated at 54, also any suitable water and feather discharge chute indicated at 55.

The form of drum shown in Fig. 9 is substantially rectangular or polygonal and may be of the spaced slat, round bar, or cage-like construction previously described but is here indicated as of sheet metal 57 with internal longitudinal ribs 58 either made integral or attached, and also with slots 59 to pass the feathers. This form is shown with the beater B mounted on the same central axis with the beater shaft 8, within hollow trunnion shafts 60 to rotatably support the drum at opposite ends, as from spiders not shown. The drum and beater are preferably driven in opposite directions as explained for Fig. 1. Regarding the shape of the drum, the spaced slatted wall 2 of the drum shown in Fig. 1 may be considered as circular or polygonal since it is composed of many flat sides.

Of course the apparatus may be made in two or three sizes to better handle various sizes of fowl and other birds, but for the average chicken a drum of about 28 inches in diameter and slats spaced about 2¼ inches apart and beaters of about 27 inches diameter has been found satisfactory.

It should be noted that while wet picking generally gives the best results, some fowl may be satisfactorily run through the machine dry, and in such case air may be circulated through the machine to carry out the dry feathers, as is well known in removing light waste materials from machines.

Having thus described my improvement in fowl defeathering process and some of the variations in equipment for carrying out the process or method, what I claim is:

1. A fowl-picking machine for defeathering loose fowl placed therein comprising the combination of three elements namely (1) an assemblage of flexible, frictional fowl-defeathering beaters mounted for rotation about an axis, (2) means operatively connected to said assemblage for rotating it rapidly with its beaters, and (3) means positioned next adjacent to said assemblage extending at least partially substantially circumferentially of said assemblage and formed and positioned with respect thereto to confine loose fowl in at least recurrent defeathering engagement with said beaters when said assemblage is rotating yet permitting the loose fowl to be tumbled about to expose every part of the fowl to the defeathering blows of said beaters.

2. A fowl-picking machine for defeathering loose fowl as claimed in claim 1 in which said assemblage is mounted to revolve about an upwardly extending axis, and which includes means retarding the free circulation of the fowl thereabout.

3. A fowl-picking machine capable of simultaneously defeathering a plurality of loose fowl placed therein, comprising one assemblage only of flexible, frictional fowl-defeathering beaters, said assemblage being mounted for rotation about an upwardly extending axis, means operatively connected to said assemblage for rotating it with its beaters about said axis to thereby cause said beaters to strike the loose fowl and tumble them about in all directions, wall means surrounding said assemblage and positioned with respect thereto to confine loose fowl in tumbling defeathering engagement with said beaters when struck thereby, whereby the loose fowl which tend to be thrown away from the rotating beaters by centrifugal action are retained in loose, tumbling relation with said beaters until the feathers are substantially all removed.

4. A fowl-picking machine for defeathering loose fowl placed therein comprising the combination of an assemblage of soft, flexible, frictional, fowl-defeathering beaters, wall means formed and positioned with respect to said assemblage to maintain loose fowl in striking relation with said beaters but free to be tumbled about in all directions when struck thereby, said wall means being arranged to extend at least partially about said assemblage in a manner to guide the loose fowl bodily thereabout, and means for relatively rotating said assemblage and said wall means rapidly.

5. A fowl-picking machine as claimed in claim 4 in which said wall means is formed and arranged to urge the fowl back into striking relation with said beaters as the fowl tend to be thrown outwardly when struck thereby.

6. A fowl-picking machine as claimed in claim 4 in which said wall means is mounted for revolution about said assemblage and provided with means for revolving it in the opposite direction from the rotation of said assemblage.

7. A fowl-picking machine for defeathering loose fowl placed therein comprising the combination of one rotary assemblage only of soft, flexible, frictional fowl-deathering beaters, means positioned with respect to said assemblage to confine loose fowl in at least recurrent contact with said beaters when the assemblage is rotating but free to tumble about in all directions when struck by the beaters to thereby permit the beaters to strike the loose fowl all over, said means extending generally circumferentially of said assemblage and being arranged to guide in that direction bodily movement imparted to the fowl, and means operatively connected to said assemblage for rotating it rapidly.

8. A fowl-picking machine as claimed in claim 7 in which a portion of said confining means consists of a door which, when open, provides access from the interior of said confining means to the exterior of said machine, said door being positioned to permit defeathered fowl to be thrown out of the machine by centrifugal action of the beaters thereon when said door is opened at the conclusion of a defeathering operation.

9. A fowl-picking machine for defeathering loose fowl placed therein comprising the combination of an assemblage of soft, flexible, frictional fowl-defeathering beaters mounted for rotation about an axis, means operatively connected with said assemblage for rapidly rotating it with its beaters, container means surrounding said assemblage of a size to receive and maintain loose fowl in striking relation to said beaters when struck thereby and tumbled about in all directions within said container means, when the assemblage is rotating.

10. A fowl-picking machine as claimed in claim 9 in which said container means is provided with at least one opening to pass released feathers.

11. An apparatus for defeathering loose fowl comprising the combination of an assemblage of soft, flexible, frictional fowl-defeathering beaters mounted for rotation about an axis, means operatively connected with said assemblage for rapidly rotating the assemblage with its beaters, a container surrounding said assemblage of a size to receive and maintain loose fowl in striking relation to said beaters and free for tumbling about in all directions within said container when struck by the beaters, and frictional means supported at the inner side of the container arranged to frictionally engage and retard the fowl against free bodily movement about the container.

12. A fowl-picking machine for defeathering a plurality of loose fowl placed therein comprising the combination of an assemblage of soft, flexible, frictional fowl-defeathering beaters supported for movement in a defined path, means operatively connected to said assemblage of beaters to rapidly move said beaters in said path, to thereby cause the beaters to strike the fowl with defeathering blows which tend to move the fowl bodily and which at least aid in tumbling the fowl about in all directions, and wall means mounted adjacent said assemblage adapted and arranged to confine loose fowl in position to be struck by the moving beaters yet free to tumble about in all directions when struck thereby, said wall means being formed and positioned to guide the loose fowl bodily generally along at least a portion of the path of the beaters which act to strike the fowl all over and tumble the fowl about until the feathers are substantially all removed.

13. A mechanical fowl-defeathering apparatus comprising the combination of container means adapted to hold loose fowl for tumbling about therein, fowl-defeathering beater means within said container means, and means for rotating the beater means and the container means relatively in a manner to tumble the fowl about within the container means so as to be struck all over by the beater means, and whereby the feathers of the fowl are substantially all removed.

References Cited in the file of this patent
UNITED STATES PATENTS

| | | |
|---|---|---|
| 486,441 | Empson | Nov. 22, 1892 |
| 1,024,412 | Meier | Apr. 23, 1912 |
| 1,096,038 | Kramer | May 12, 1914 |
| 1,167,573 | Kohlhepp | Jan. 11, 1916 |
| 2,376,120 | Campbell et al. | May 15, 1945 |
| 2,389,404 | Barker | Nov. 20, 1945 |
| 2,472,468 | Digby | June 7, 1949 |
| 2,546,288 | Zucker | Mar. 27, 1951 |
| 2,557,335 | Barker | June 19, 1951 |
| 2,560,524 | Johnson | July 10, 1951 |
| 2,596,443 | Sharp | May 13, 1952 |